United States Patent
Blackketter et al.

(10) Patent No.: US 7,103,904 B1
(45) Date of Patent: Sep. 5, 2006

(54) METHODS AND APPARATUS FOR BROADCASTING INTERACTIVE ADVERTISING USING REMOTE ADVERTISING TEMPLATES

(75) Inventors: Dean J. Blackketter, San Francisco, CA (US); Daniel J. Zigmond, Carnation, WA (US); Sandra R. Bernardi, Los Altos Hills, CA (US); Timothy F. Park, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/345,223

(22) Filed: Jun. 30, 1999

(51) Int. Cl.
H04N 7/10 (2006.01)
H04N 7/025 (2006.01)

(52) U.S. Cl. .......................... 725/32; 725/42
(58) Field of Classification Search ............ 725/32–36, 725/135–138, 42
See application file for complete search history.

(56) References Cited

U.S. PATENT DOCUMENTS

| | | | |
|---|---|---|---|
| 5,796,967 A | 8/1998 | Filepp et al. | 395/339 |
| 5,798,785 A | 8/1998 | Hendricks et al. | 348/1 |
| 5,818,935 A | 10/1998 | Maa | 380/20 |
| 5,826,165 A | 10/1998 | Echeita et al. | 455/2 |
| 5,848,352 A * | 12/1998 | Dougherty et al. | 725/110 |
| 5,848,396 A * | 12/1998 | Gerace | 705/10 |
| 5,848,397 A | 12/1998 | Marsh et al. | 705/14 |
| 6,177,931 B1 * | 1/2001 | Alexander et al. | 725/52 |
| 6,215,483 B1 * | 4/2001 | Zigmond | 725/112 |
| 6,229,541 B1 * | 5/2001 | Kamen et al. | 345/357 |
| 6,357,042 B1 * | 3/2002 | Srinivasan et al. | 725/32 |
| 6,446,261 B1 * | 9/2002 | Rosser | 725/34 |
| 2001/0056577 A1 * | 12/2001 | Gordon et al. | 725/52 |

OTHER PUBLICATIONS

U.S. Appl. No. 09/099,118, filed Jun. 17, 1999, D. J. Zigmond.
S. Deering, "Host Extensions for IP Multicasting" (Aug. 1989).
Advanced Television Enhancement Forum Specification (ATVEF), Version 1.1 revision 26, (Feb. 2, 1999).
J. Postel, "User Datagram Protocol," (Aug. 1980), identified as page "ftp://ftp.isi.edu/in-notes/rfc768.txt".
Electronic Industries Association EIA-608, "Recommended Practice for Line 21 Data Service" (Sep. 1994).

(Continued)

*Primary Examiner*—Chris Kelley
*Assistant Examiner*—Reuben Brown
(74) *Attorney, Agent, or Firm*—Workman Nydegger (57) ABSTRACT

Described are methods and apparatus for enhancing a television advertisement simultaneously displayed on a number of remote receivers. In one embodiment, one or more advertisement templates are stored in memory on each of the remote receivers. The templates include formatting information and data fields into which can be inserted predefined types of information. For example, a selected template may be adapted to receive and display an advertiser's name, product, and a hyperlink to the advertiser's web site. A content creator, (e.g., a program producer, broadcaster, affiliate, cable company or satellite provider), embeds an advertisement summary in a data service channel of a broadcast signal. The advertisement summary includes a resource identifier unique to a selected one of the advertisement templates. Upon receiving an advertisement summary directed to a resident advertisement template, the receiver combines custom advertisement information provided in the advertisement summary with formatting information provided in the advertisement template. The receiver employs the combined information to create and display a custom advertisement, which may include hyperlinks to additional produce or service information.

28 Claims, 6 Drawing Sheets

OTHER PUBLICATIONS

Electronic Industries Association EIA-746A, "Transport of Internet Uniform Resource Locator (URL) Information Using Text-2 (T-2) Service" (Sep. 1998).

R. Panabaker, S. Wegerif, and D. Zigmond, "The Transmission of IP Over the Vertical Blanking Interval of a Television Signal," (Feb. 1999).

* cited by examiner

METHODS AND APPARATUS FOR BROADCASTING INTERACTIVE ADVERTISING USING REMOTE ADVERTISING TEMPLATES

TECHNICAL FIELD

The invention relates generally to supplementing broadcast television programming with interactive content, and in particular to interactive advertising.

BACKGROUND OF THE INVENTION

The Internet is a worldwide collection of networks and gateways. The Internet includes a backbone of high-speed data communication lines between major nodes, consisting of thousands of commercial, government, educational, and other computer systems, that route data and messages. The WorldWide Web (the Web) is a collection of formatted hypertext pages located on numerous computer systems around the world that are logically connected by the Internet. The Web has become a valuable information resource.

Web browsers, software providing user interfaces to the Web, allow individuals to access Internet content from personal computers. Internet terminals, such as those pioneered by WebTV Networks, Inc., the assignee of the present invention, have made the Web accessible to an even larger segment of the population by providing Web access without a personal computer. Internet terminals (also commonly referred to as set-top boxes) provide Web access using an ordinary television (TV) set as a display and a remote control or wireless keyboard for user input.

Figure 1:
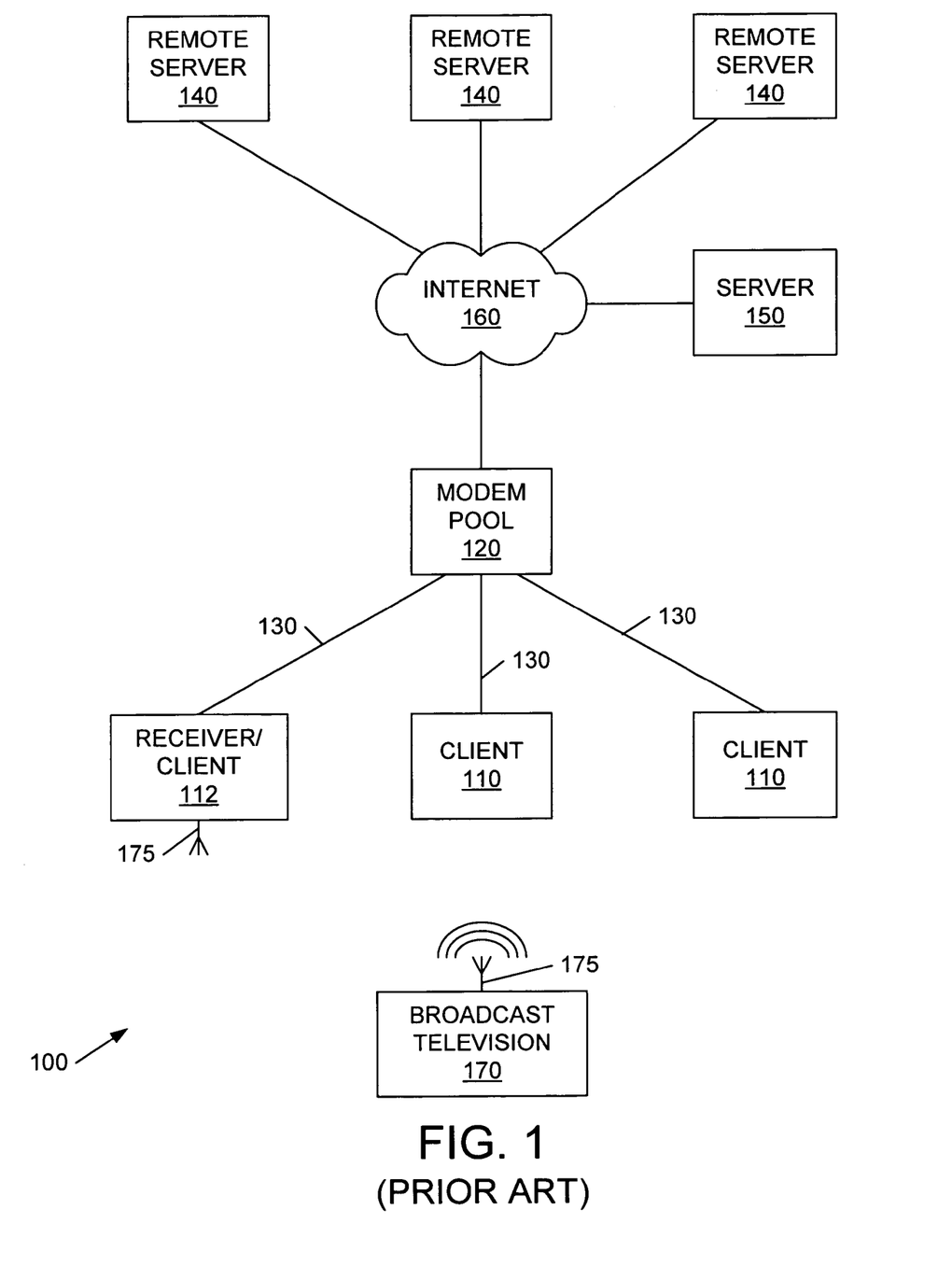
FIG. 1 (prior art) illustrates a basic configuration of an Internet system network 100.

FIG. 1 illustrates a basic configuration of a network 100 that includes Internet and broadcast-television components. Network 100 includes a pair of clients 110 and a receiver/client 112. Receiver/client 112 is so named because it operates both as a television receiver and as an Internet client. Hereafter, receiver/client 112 is referred to as receiver 112 for simplicity.

Clients 110 and receiver 112 are coupled to a modem pool 120 via direct-dial, bi-directional data connections 130, which may be telephone (POTS, i.e., "plain old telephone service"), cable, satellite forward channels, ISDN (Integrated Services Digital Network), or any other similar type of connection. Modem pool 120 is typically coupled to a number of remote servers 140 via a network infrastructure, such as the Internet 160. An additional server 150 specifically supports receiver 112.

Clients 110 and receiver 112 communicate bi-directionally with servers 140 and 150 through modem pool 120 and the Internet 160. Modem pool 120 is typical of those found today throughout the world providing access to the Internet and private networks. In addition to communicating with servers 140 and 150, receiver 112 receives broadcast data and video from a broadcast television network 170 via, e.g., antennas 175. Broadcast television can be delivered using many mediums, including terrestrial (i.e., "over-the-air") broadcast, cable transmission, satellite transmission, or computer networks.

Figure 2:
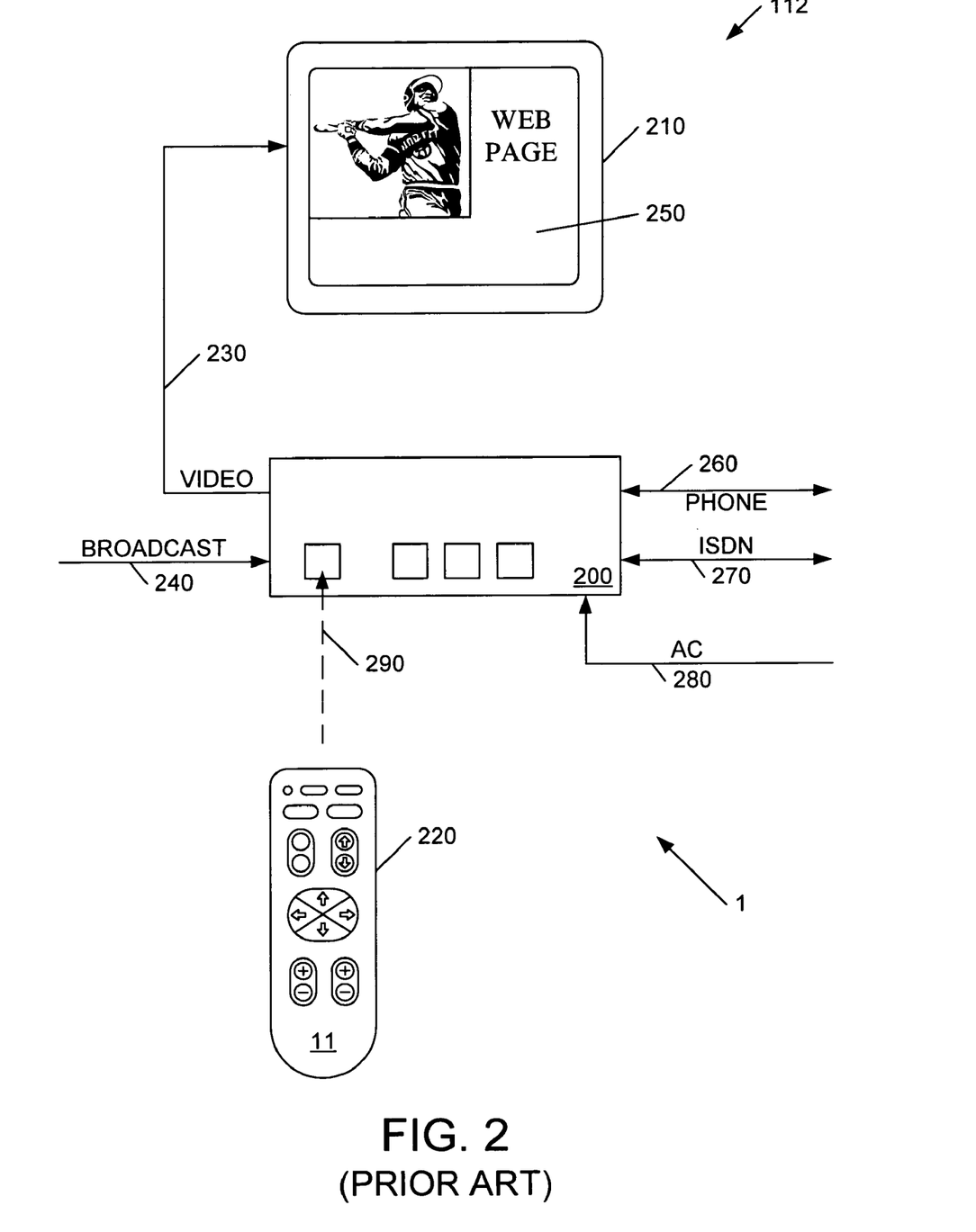
FIG. 2 (prior art) illustrates an embodiment of a receiver/client 112 for displaying broadcast television and Internet content.

FIG. 2 illustrates an embodiment of receiver 112. Receiver 112 includes set-top box 200, an ordinary analog television set 210, and a remote control 220. Set-top box 200 may be integrated with television set 210. Television set 210 displays video data, including a graphical user interface, conveyed from set-top box 200 by a video link 230. Video link 230 is an RF (radio frequency), S-video, composite video, or other video link.

Set-top box 200 includes hardware and software for receiving and decoding a broadcast video signal 240, such as an NTSC, PAL, SECAM, or other TV system video signal, and for providing video data to the television set via video link 230. Set-top box 200 also includes hardware and/or software for providing a user with a graphical user interface 250 capable of displaying Web pages (e.g., HTML or XML pages) and broadcast video. User interface 250 can notify the user of the presence of encoded data embedded in the video signal. The notification may be audible, visual, or a combination of the two. For example, user interface 250 might temporarily display an icon in a portion of the screen.

Set-top box 200 may include both a standard modem and an ISDN modem, such that the communication link between set-top box 200 and server 150 (FIG. 1) can be either a telephone (POTS) connection 260 or an ISDN connection 270. Set-top box 200 receives power through a power line 280.

A user operates remote control 220 to control set-top box 200 in browsing the Web, sending e-mail, and performing other Internet-related functions. Set-top box 200 receives commands from remote control 220 via an infrared (IR) communication link 290. A keyboard (not shown) may also be included.

Exemplary Receiver System Architecture

Figure 3:
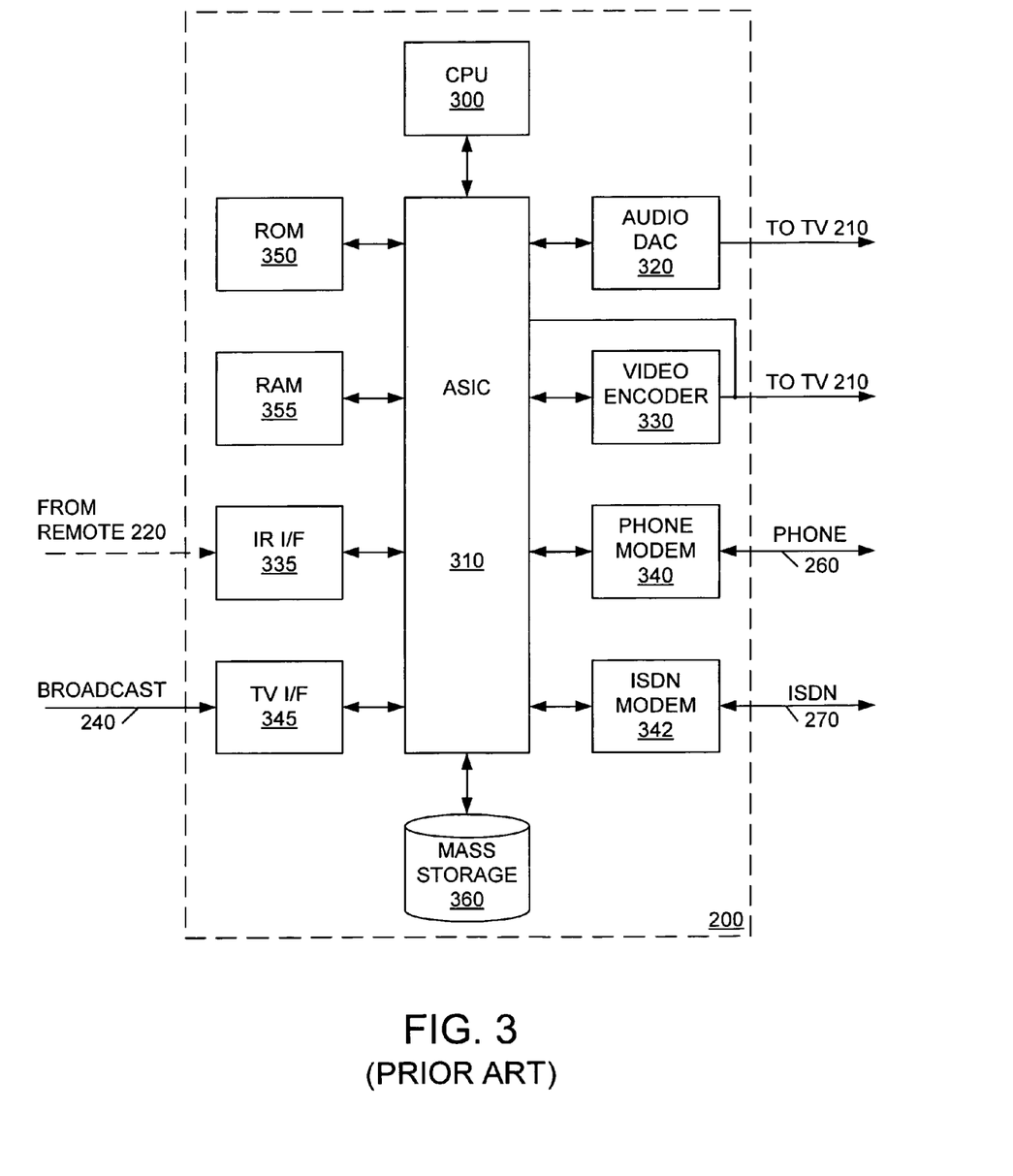
FIG. 3 (prior art) is a block diagram illustrating internal features of a set-top box 200.

FIG. 3 is a block diagram illustrating internal features of set-top box 200. A processing unit, such as central processing unit (CPU) 300, and an Application-Specific Integrated Circuit (ASIC) 310 control set-top box 200. ASIC 310 contains circuitry that implements certain features provided by set-top box 200. ASIC 310 is coupled to an audio digital-to-analog converter (DAC) 320 that provides audio output to television 210. ASIC 310 connects to a video encoder 330 that provides video output to television 210. An IR interface 335 detects IR signals transmitted by remote control 220 and, in response, provides corresponding electrical signals to ASIC 310. A standard telephone modem 340 and/or an ISDN modem 342 coupled to ASIC 310 provide connections 260 and 270, respectively, to the Internet.

A television interface (TV I/F) 345 conveys broadcast video signals to ASIC 310. ASIC 310 in turn presents video data carried in broadcast video signal 240 to a viewer of TV 210. TV interface 345 also extracts other data that may be embedded in the video signal. The data so extracted, or a portion thereof, may be displayed concurrently with a television program. For example, analog broadcast signals typically include a portion known as the vertical blanking interval (VBI) that includes a data-service channel for transmitting, among other things, closed-captioning information. TV interface 345 extracts data inserted into the VBI for display on TV 210.

Set-top box 200 also includes read-only Memory (ROM) 350, random-access memory 355, and a mass storage device 360. ROM 350 stores program code for application software executed by CPU 300. RAM 355 serves as temporary storage for CPU 300 as CPU 300 executes instructions. Mass storage device 360 may be used to input software or data to set-top box 200 or to store information received either from network connections or from broadcast signals. Mass storage device 360 includes any suitable data storage medium, such as magnetic tapes, magnetic disks, and optical disks.

A number of companies support appliances similar to receiver 112 to enhance broadcast television with Internet content. Unfortunately, the bandwidth of the VBI is limited, so content-rich Web pages or other interactive resources can be slow to broadcast. Consequently, content updates can be undesirably slow. This speed limitation is particularly important to advertisers, who must provide the user an interactive experience in the time span of a fifteen- or thirty-second commercial.

As discussed above, some receivers include telephone connections that may be used in place of or as a supplement to the VBI. Such connections do not solve the advertisement bandwidth problems entirely, however, because not all users have access to or are willing to maintain a dial-up connection. Further, establishing a dial-up connection generally takes too long to be practical during a commercial. Thus, the VBI bandwidth limitation is a barrier to effective interactive advertising.

SUMMARY OF THE INVENTION

The present invention addresses the bandwidth barrier to effective interactive advertising. In one embodiment, one or more advertisement templates are stored on a number of remote receivers. The templates include formatting information and fields into which can be inserted predefined types of information. For example, a selected template may be adapted to receive and display an advertiser's name, product, and a hyperlink to the advertiser's web site. A local identifier assigned to each template uniquely identifies the template on every receiver.

In accordance with the invention, broadcasters create advertisement summaries that include information for display by a selected template. The advertisement summary includes a resource identifier identical to that of the selected template and specific information for insertion into various fields of the selected template. Broadcasters then broadcast the advertisement summary, typically in a data service channel of a broadcast video signal. Receivers in which the selected template is stored combine the information presented in the advertisement summary with the formatting information of the template to produce and display a custom advertisement. The advertisement summary typically contains far less information than the resulting custom advertisement. Custom advertisements can therefore be presented to viewers in a timely fashion without an Internet connection.

In one embodiment of the invention, the data service channel is a captioning service channel. Captioning service channels have low bandwidths. Broadcasting advertisement summaries in a captioning service channel is nevertheless desirable because captioning service channels generally offer very reliable communication. Some embodiments further enhance reliability using a checksum inserted into the advertisement summary.

The invention is embodied in machine-readable mediums having stored thereon data representing sequences of instructions. These instructions, when executed by a processor, cause the processor to embed advertisement summaries in a data service channel of a signal. Other instruction sequences executed on remote receivers combine the advertisement summaries with local advertisement templates and display the resulting custom advertisements. The custom advertisements can include dynamic Internet content to provide viewers with interactive advertising experiences.

Other features of the present invention will be apparent from the accompanying drawings and from the detailed description that follows.

DETAILED DESCRIPTION OF THE INVENTION

Figure 4:
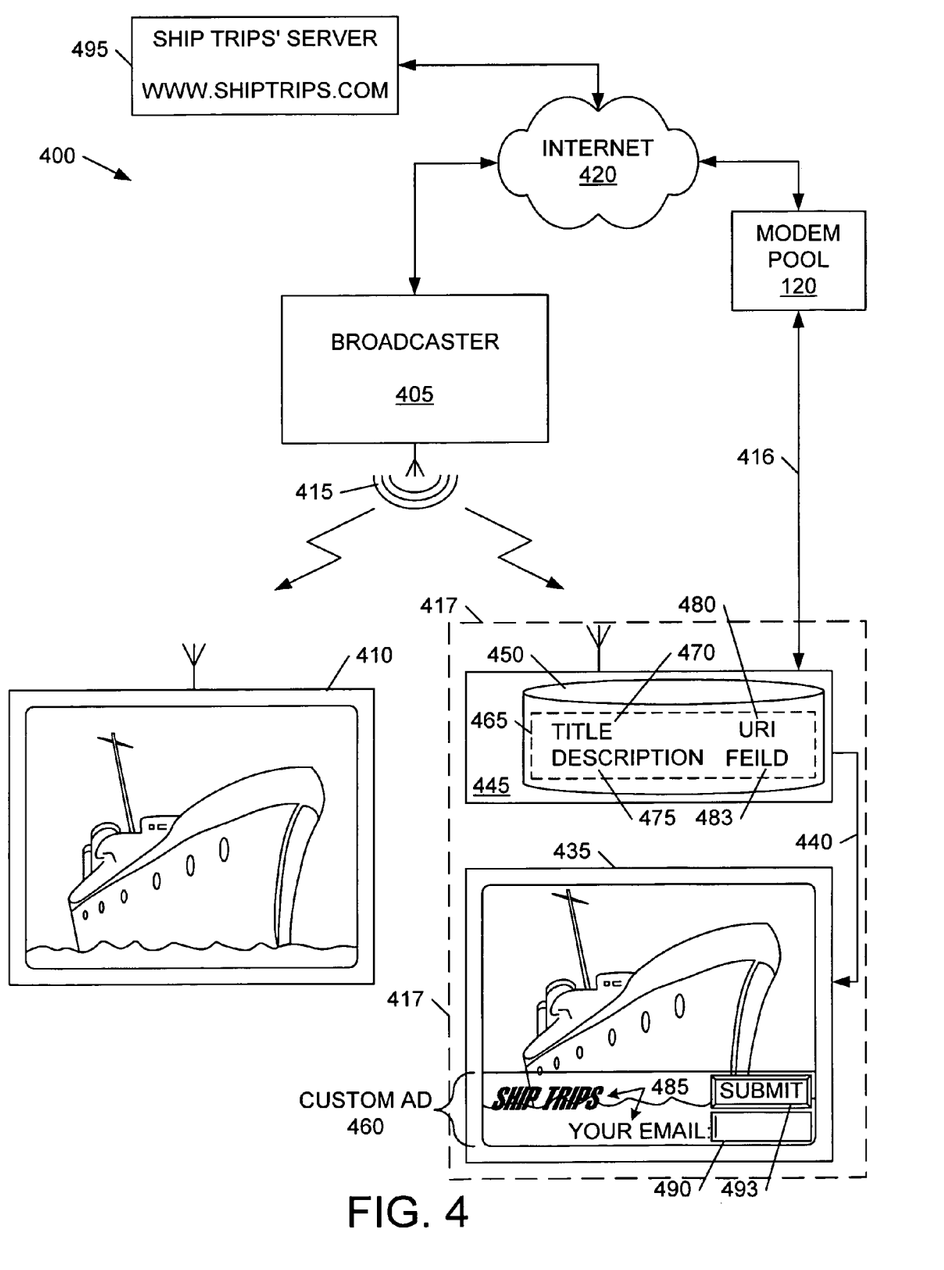
FIG. 4 illustrates a communication system 400 in which a broadcaster 405 communicates with a conventional television set 410 via a broadcast video signal 415 and a bi-directional network connection through the Internet 420.

FIG. 4 illustrates a communication system 400 in which a broadcaster 405 communicates with a television set 410 via a broadcast video signal 415 and with a receiver 417 via broadcast video signal 415 and a bi-directional network connection 416 through the Internet 420. Internet 420 is understood to include all required modems, lines, and other components.

Receiver 417 includes a second television set 435 connected via a video line 440 to a set-top box 445 similar to set-top box 200 of FIGS. 2 and 3. Television set 435 and set-top box 445 work together to display Web pages, broadcast television, or both. Web pages are typically downloaded over the Internet 420, but may also be received from a broadcast television signal or retrieved from a local memory source, such as a disk drive 450 in set-top box 445. Set-top box 445 stores Web pages locally in each case.

Receiver 417 and television set 410 each show, for illustrative purposes, a broadcast television commercial sponsored by a cruise line. In accordance with the invention, a portion of television set 435 in receiver 417 additionally displays an interactive custom advertisement 460 related to the commercial.

A displayed television program need not be related to a simultaneously displayed advertisement. For example, television 435 can simultaneously display a sports program and a clothing advertisement. Furthermore, the invention is not limited to advertisements. Custom advertisement 460 can be substituted for a field displaying sports scores, local weather, or television channel information, to name just a few possibilities.

The bandwidth of the data-service channels of broadcast video signal 415 is limited. Moreover, some of that bandwidth may be used to provide closed captioning and other data services. The available bandwidth may therefore be too limited to transmit the data required to render custom advertisement 460 in a timely fashion, for example during the first few seconds of a 15- or 30-second commercial. The present invention overcomes this bandwidth limitation, enabling content providers to quickly present viewers with interactive custom advertisements or other interactive content.

Disk drive 450, or some other storage medium, includes an advertisement template 465, which in turn includes generic interactive content. For example, advertisement 465 includes a title field 470, a description field 475, a URI field 480, and a form-entry field 483. As discussed below, these fields are adapted to accept custom advertising information that allows a sponsor to solicit email addresses from interested viewers. Other embodiments include additional advertisement templates—each with a unique resource identifier—that offer different configurations for sponsors' ads. Different templates may offer different font options, different numbers and sizes of text boxes, and different color and transparency options, for example.

Broadcaster 405 can broadcast an advertisement summary as a trigger directed to advertisement template 465. In the example, the advertisement summary communicates a sponsor's name and solicits a viewer's email address. Set-top box 445 combines template 465 with the advertisement summary and displays the result as custom advertisement 460. Custom advertisement 460 includes a form field 490 into which a viewer can enter his or her email address to request additional information about the advertised cruise. The viewer can then submit the email address by selecting a "submit" button 493 using, e.g., a mouse or remote control. The sponsor, "Ship Trips" in the example, could then send the viewer additional information from a server 495 that Ship Trips maintains.

The following text is exemplary HTML code for advertisement template 465.

```
<HTML>
<HEAD>
<SCRIPT LANGUAGE="JavaScript">
function setup(title, description, field, uri)
{
document.write(
   "<B>"+title+"</B><BR>"
  +"<FORM action="+uri +">"
  +description
  +"<INPUT TYPE=text NAME="+field +">"
  +"<INPUT TYPE=submit></FORM>"
  )
}
</SCRIPT>
</HEAD>
<BODY BGCOLOR="#ff0000">
<! Embed TV here>
<IMG SRC="tv:" height=300 width=400>
<BR>
</BODY>
</HTML>
```

Advertising template 465 can be loaded into set-top box 440 via an Internet connection, the VBI, or by any other conventional means. Once set-top box 440 has advertisement template 465 in local memory, broadcaster 405 can broadcast an advertisement summary directed to template 465. Receiver 417 can then combine the information in the advertisement summary with that of template 465 to create and display a custom advertisement (e.g., custom advertisement 460).

Advertisement template 465 is relatively simple: other, more complex, templates can easily be imagined. Such templates can be sufficiently complex that the data used to represent custom advertisements is too great to transmit during a broadcast television commercial or other time-limited program. That is, the data required to represent the custom advertisement is greater than the product of the available bandwidth and the duration of the program. Furthermore, viewers may not have sufficient time to interact with displayed content even where custom advertisements can be transmitted within the timeframe of a program. In either case, broadcasting summaries to be combined with local templates increases the time during which viewers may interact with a custom advertisement, and consequently increases the probability that viewers will interact with an advertisement.

Over time, particular advertisement templates may become obsolete. Some templates therefore include a time stamp that stores the date that the template was last used. Templates that have not been used for a specified time can then be deleted to save space in local memory.

Advertisement Summaries

Advertisement summaries are trigger messages, or "triggers," broadcast to receivers of broadcast video. Such triggers generally instruct receivers to take a specific action to synchronize the content of a Web page with a broadcast television program. For purposes of the present invention, advertisement summaries are triggers that (1) are addressed to templates stored in remote receivers, and (2) include custom advertisement information to be combined with templates to create a custom advertisement.

Advertisement summaries include a resource identifier and one or more attribute/value pairs. The resource identifier addresses a particular template, while the attributes identify fields within the template into which the values are inserted. Advertisement summaries may be transmitted in the VBI of a broadcast video signal. The text service channels of line 21 of the VBI provide a robust communication medium, albeit at relatively low bandwidth. In some embodiments of the invention, advertisement summaries are text based, and their syntax follows a basic format that complies with the Electronic Industries Association EIA-746A, "Transport of Internet Uniform Resource Locator (URL) Information Using Text-2 (T-2) Service" (September 1998). EIA-746A defines the formatting necessary to transmit Internet URLs using the vertical-blanking interval of a broadcast television signal, and is incorporated herein by reference. URLs are a conventional type of universal resource identifier, or "URI," which is a character string used to identify a resource, such as a file. Other types of URIs include local identifiers (LIDs), and universal resource names (URNs).

In one embodiment that complies with EIA-746A, each advertisement summary includes a URI, or universal resource identifier, followed by zero or more attribute/value pairs and an optional checksum, as follows:

<uri>[attr$_1$:val$_1$] [attr$_2$:val$_2$] . . . [attr$_n$:val$_n$] [checksum]

The URI is enclosed in angle brackets. For example, the URI "lid//www.webtv.net/template/info" might identify template 465.

The following is an exemplary advertising summary for combining with the foregoing HTML template to create custom advertisement 460 of FIG. 4:

<lid://www.webtv.net/template/info>[name:More about Ship Trips] [script:setup("SHIP TRIPS", "your email:", "email", "http://shiptrips.com/emailinfo")] [12ab]

The "lid" field includes a URI that identifies the target advertisement template. The sponsor parameter "SHIP TRIPS" passed with the script attribute allows a sponsor to fill in title field 470 with the sponsor's identity. Similarly, description and URI parameters allow the sponsor to fill in respective description and URI fields 475 and 480. The sponsor and description parameters provide viewers with readable text 485, while the URI parameter provides viewers with a hyperlink 490 to additional information of interest. For example, a viewer might select hyperlink 490 to establish an Internet connection to server 495 to obtain additional information about the advertised cruise.

The attributes discussed above are exemplary. Other useful attributes include color, font style, font size, transparency, texture, advertisement size, and advertisement position. The templates might also include a number of predefined logos that could be selected using a "logo" attribute that accepts a value corresponding to a desired logo. For example, the Microsoft Windows™ logo might be displayed when the logo attribute is provided with an ASCII number 5.

The duration of a typical television commercial limits the amount of time that a custom advertisement should be displayed. Referring to the example of FIG. 4, for example, custom advertisement 460 should not carry over into a subsequent commercial. Thus, some embodiments include a "time-out" attribute that allows the author of an advertisement summary to determine the longevity of a given custom advertisement. Alternatively, custom advertisements could be removed using a trigger. Advertisers may provide such a trigger at the beginning of a commercial to ensure that templates associated with previous commercials are removed.

Conventional interactive television typically prompts the viewer to determine whether the viewer is interested in interactive content before presenting the interactive content. Sponsors may wish to provide the interactive custom advertisement to viewers without first seeking permission to do so. Thus, one embodiment includes and "auto" attribute that allows a content creator to specify whether a custom advertisement should be automatically presented to the viewer or should be presented only if the viewer seeks additional information.

A checksum may be appended to the end of the logical address link to detect data corruption that may occur during receipt or transmission of a trigger. A two-byte hexadecimal checksum is employed such as a checksum that would be produced by the standard TCP/IP checksum algorithm described in Request For Comments (RFC) 719, "Internet Protocol," September 1981, which is incorporated herein by reference. According to one embodiment, the checksum is computed by pairing adjacent characters in the string (starting with the first delimiter) to form 16-bit integers. If there is an odd number of characters, the final character is paired with a byte value of zero. The checksum is computed such that the one's complement sum of all of the 16-bit integers plus the checksum equals the 16-bit integer with all 1 bits.

Broadcast Method

Figure 5:
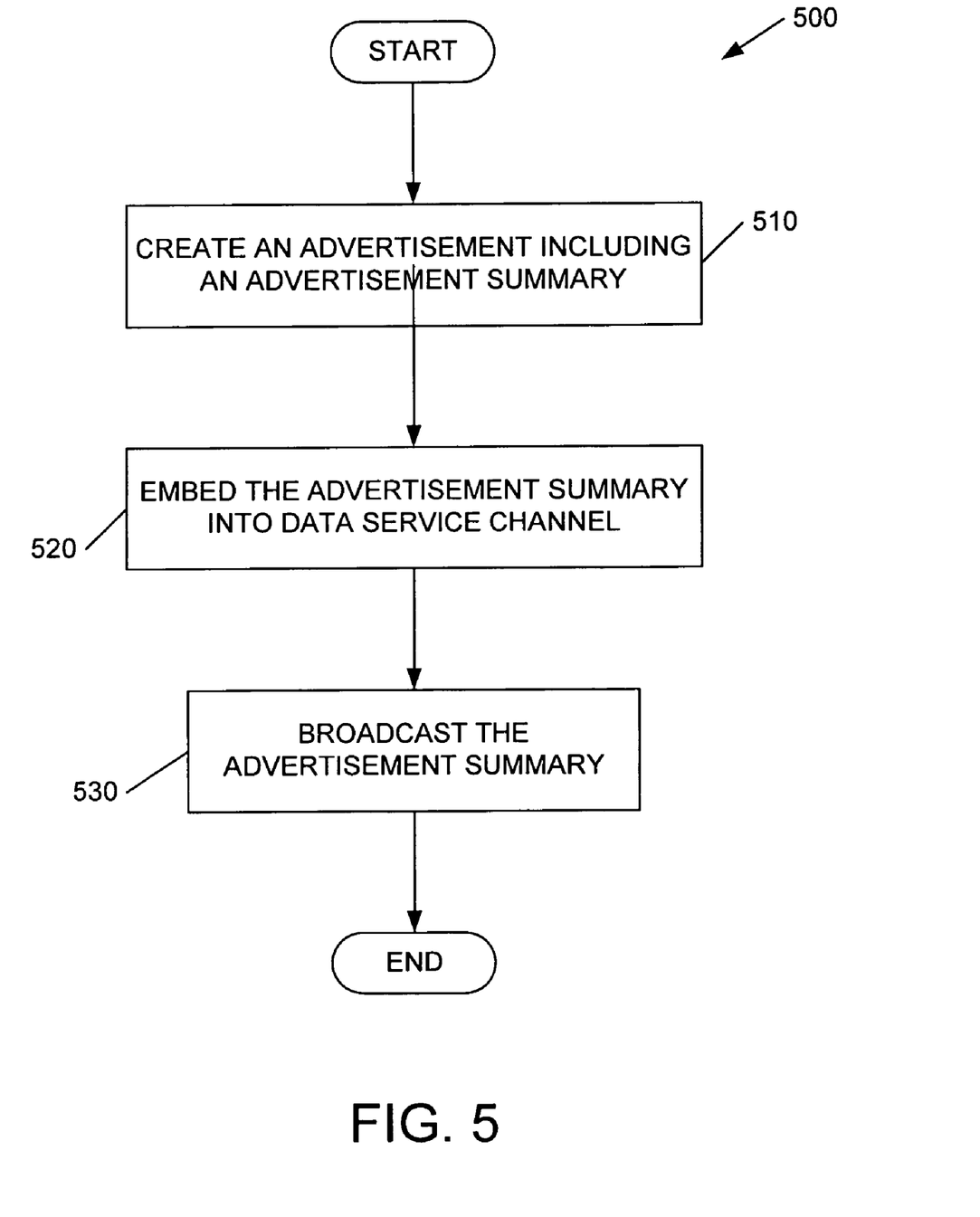
FIG. 5 is a flowchart 500 depicting a method employed by a content creator to broadcast advertisement summaries to advertisement templates stored locally on a number of remote receivers.

FIG. 5 is a flowchart 500 depicting a method employed by a content creator (e.g., a program producer, broadcaster, affiliate, cable company or satellite provider) to broadcast advertisement summaries to advertisement templates stored locally on a number of remote receivers.

The content creator, typically an employee of the sponsor, first creates an advertisement summary (step 510) using, for example, the syntax described above. The content creator then embeds the advertisement summary into a data service channel of a video signal to be broadcast (step 520). The video signal might represent a television commercial stored on videotape, for example. The sponsor then delivers the commercial to a broadcaster. Finally, the broadcaster broadcasts the commercial, including the advertisement summary (step 530).

In one embodiment, the broadcast video signal is a National Television Standards Committee (NTSC) video signal including a vertical blanking interval (VBI), and the data service channel is selected from a captioning service channel of a text service channel. The video signal may also be Phase Alternate Lines (PAL), Sequential Couleur Avec Memoire (SECAM), High Definition Television (HDTV), or a digital video signal such as a Digital Video Broadcasting (DVB) signal or an Advanced Television Systems Committee (ATSC) signal. Where the broadcast video signal is NTSC video signal, the advertisement summary can be imbedded into line 21 of the vertical blanking interval (VBI). The protocols for broadcasting data in line 21 of the VBI call for relatively robust, low-speed communication. Higher bandwidth can be obtained using other lines of the VBI.

Advertisement summaries need not be provided with a commercial. Where desired, a content creator may embed one or more advertisement summaries into a captioning or text service packet of a video signal. This process may be repeated during video signal processing at each point along the video-signal distribution path.

The foregoing broadcast methods are embodied in machine-executable instructions, which can be used to cause a general-purpose or special-purpose processor programmed with the instructions to perform the steps. Alternatively, the steps might be performed by specific hardware components that contain hardwired logic for performing the steps, or by any combination of programmed computer components and dedicated hardware.

Receiver Method

Figure 6:
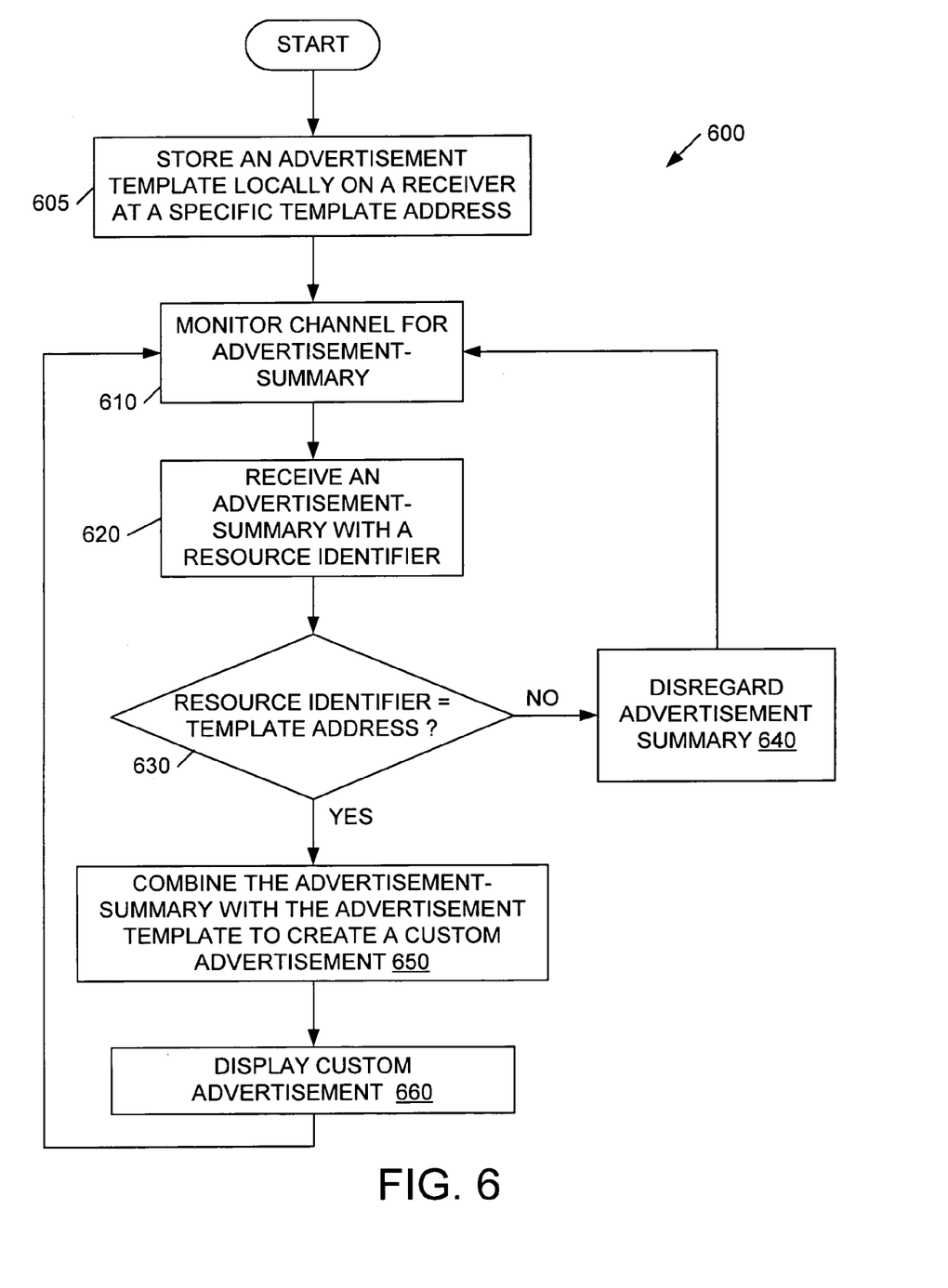
FIG. 6 is a flowchart 600 depicting a method performed by a receiver configured in accordance with the invention to respond to advertisement summaries.

FIG. 6 is a flowchart 600 depicting a method performed by a receiver configured in accordance with the invention to respond to advertisement summaries. First, the receiver stores an advertisement template in local memory (step 605). The receiver can obtain the resource from any number of information sources, such as from a server on the Internet, from a broadcast signal, or from a local memory device, such as a hard-disk drive or CD-ROM drive.

In one embodiment, the templates are Web pages (e.g., HTML or XML pages). The templates include a unique local resource identifier and formatting information. The templates may also include a script capable of receiving data from an advertisement summary and incorporating that data into the template. Alternatively, a script for incorporating data into the template may be included in the advertisement summary. In either case, the script might be written in a scripting language, such as JavaScript™, ECMAScript, JScript™, or VBScript. Such scripts allow content creators to dynamically alter the HTML content of the template.

Next, in step 610, the receiver monitors one or more broadcast channels for valid advertisement summaries directed to the stored advertisement template. For example, where the advertisement template is identified by an LID, the receiver monitors broadcast video for advertisement summaries that include an LID matching that of the advertisement template. A valid advertisement template is one that is encoded in a predetermined syntax, such as the syntax described above, and whose resource identifier and attribute/value pairs are not corrupted. The above-described checksum is used to determine whether the resource identifier and attribute/value pairs are corrupted. The receiver ignores invalid advertisement summaries.

Upon receipt of a valid advertisement summary matching the advertisement template (step 620), the receiver determines whether the resource identifier associated with the advertisement summary matches that of an advertisement template stored in local memory (decision 630). If not, the receiver disregards the advertisement summary (step 640) and continues monitoring the broadcast channel. In another embodiment, templates not found on the receiver can be retrieved from a remote server. Such an embodiment is particularly useful for receivers that have little local storage and/or high-bandwidth, on-demand Internet access.

If in step 630 the resource identifier matches that of an advertisement template stored in the receiver, then the receiver combines the information presented in the advertisement summary with the formatting information provided by the matching advertisement template (step 650). Combining the advertisement summary and advertisement template creates a custom advertisement. The receiver displays the custom advertisement (step 660) and continues monitoring the broadcast channel (step 610).

Some embodiments require an identical match in step 630. Others select a best match. In one embodiment, for example, receivers might include advertisement templates dedicated to particular sponsors. Any advertisement summary generated by that sponsor would then call up that template. For example, any advertisement summary in which the sponsor name included the term "Microsoft" might cause a receiver to display a dedicated Microsoft template.

The foregoing receiver methods are embodied in machine-executable instructions, which can be used to cause a general-purpose or special-purpose processor programmed with the instructions to perform the steps. Alternatively, the steps might be performed by specific hardware components that contain hardwired logic for performing the steps, or by any combination of programmed computer components and dedicated hardware.

While the present invention has been described in connection with specific embodiments, variations of these embodiments will be apparent. Therefore, the spirit and scope of the appended claims should not be limited to the foregoing description.

What is claimed is:

1. A method for creating custom advertisements in a timely manner for display with television broadcast programming, wherein the custom advertisements include custom advertisement information that can be transmitted over a data service channel having a restricted low bandwidth, but wherein the entire custom advertisement cannot be transmitted over the low bandwidth data service channel in a timely manner, the method comprising:
   a. storing, in a receiver, an advertisement template that is identified by a first resource identifier and that includes formatting information corresponding to a custom advertisement that is intended for display during a program that is transmitted over a broadcast signal;
   b. monitoring a low bandwidth data service channel of the broadcast signal for an advertisement summary that is addressed to the advertisement template, wherein the advertisement summary includes a second resource identifier and custom advertisement information; and
   c. creating the custom advertisement by combining formatting information from the advertisement template and the custom advertisement information upon determining the second resource identifier matches the first resource identifier of the information resource, and such that the custom advertisement embodies a combination of both the advertisement template and the advertising summary, the custom advertisement being too large to be transmitted over the low bandwidth channel in a timely manner during presentation of the program.

2. The method of claim 1, further comprising displaying the custom advertisement.

3. The method of claim 1, wherein the custom advertisement information includes a third resource identifier.

4. The method of claim 1, wherein the first and second resource identifiers are local resource identifiers.

5. A method as recited in claim 1, wherein the advertising summary is broadcast as a trigger.

6. A method for broadcasting advertising content for display on a remote receiver during the display of a program, the method comprising:
   a. storing an advertisement template at a remote receiver, wherein the template includes formatting information corresponding to a custom advertisement that is intended for display during a program;
   b. embedding an advertisement summary that is addressed to the advertisement template within a data service channel of a video signal broadcasting the program, the advertisement summary including:
      i. a resource identifier unique to the advertisement template; and
      ii. custom advertisement information that is configured to be combined with the formatting information of the advertisement template by the remote receiver to create the custom advertisement, such that the custom advertisement embodies a combination of both the advertisement template and the advertising summary, wherein the custom advertisement is too large to transmit over the data service channel in a timely manner during the broadcast of the program; and
   c. broadcasting the signal to the remote receiver, such that remote receiver can create and display the custom advertisement in a timely manner during presentation of the program.

7. The method of claim 6, wherein the signal is broadcast to a second receiver in addition to the first-mentioned receiver, and wherein the information resource does not reside on the second receiver.

8. The method of claim 6, wherein the data service channel is a captioning service channel.

9. The method of claim 6, wherein the broadcast signal is a National Television Standards Committee (NTSC) video signal including a text or data-service channel.

10. The method of claim 9, wherein the data service channel is line 21 of the NTSC video signal.

11. The method of claim 10, wherein the broadcast video signal is selected from a group consisting of Phase Alternate Lines (PAL), Sequential Couleur Avec Memoire (SECAM), High Definition Television (HDTV), a Digital Video Broadcasting (DVB) signal, or an Advanced Television Systems Committee (ATSC) signal.

12. The method of claim 6, further comprising generating a checksum for the resource identifier and the advertisement summary and inserting the checksum into the advertisement summary.

13. A method as recited in claim 6, wherein the advertising summary is broadcast as a trigger.

14. A machine-readable medium having stored thereon data representing sequences of instructions, wherein the instructions, when executed by a processor, cause the processor to embed an advertisement summary in a low bandwidth data service channel of a video signal, the advertisement summary including:

a. a resource identifier unique to an advertising template residing on a remote receiver, and b. custom advertisement information that is configured to be combined with the advertisement template to create a custom advertisement, such that the custom advertisement embodies a combination of both the advertisement template and the advertising summary, and wherein the custom advertisement is too large to transmit over the data service channel in a timely manner during a broadcast of a program that is being transmitted over a video signal associated with the data service channel.

15. A machine-readable medium as recited in claim 14, wherein the advertising summary is embedded as a trigger.

16. A machine-readable medium having stored thereon data representing sequences of instructions, wherein the instructions, when executed by a processor, cause the processor to:

a. monitor a low bandwidth data service channel of a broadcast video signal for an advertisement summary that is addressed to an advertisement template that is stored by a receiver that is associated with the processor, wherein the advertisement summary includes a resource identifier and custom advertisement information, and wherein a program is being transmitted over the broadcast video signal;

b. create a custom advertisement by combining the custom advertisement information with an advertisement template upon receipt of the advertisement summary, such that the custom advertisement embodies a combination of both the advertisement template and the advertising summary, the custom advertisement being too large to be transmitted over the low bandwidth channel in a timely manner during presentation of the program; and c. display the custom advertisement with the program.

17. A machine-readable medium as recited in claim 16, wherein the advertising summary is broadcast as a trigger.

18. A system for creating custom advertisements in a timely manner for display with television broadcast programming, wherein the custom advertisements include custom advertisement information that can be transmitted over a data service channel having a restricted low bandwidth, but wherein the entire custom advertisement cannot be transmitted over the low bandwidth data service channel in a timely manner, the system comprising:

a. a broadcast signal source configured to broadcast a video signal in a broadcast video channel;

b. means for embedding an advertisement summary in a low bandwidth data service channel of the video signal, the advertisement summary comprising custom advertisement information and being addressed to a particular advertisement template; and c. a receiver configured to:

store the advertisement template in local memory, the advertisement template including formatting information for formatting the custom advertisement information into a custom advertisement;

tune to the broadcast video channel to receive the video signal and the embedded advertisement summary; and create the custom advertisement by combining the formatting information from the advertisement template with the custom advertisement information, such that the custom advertisement embodies a combination of both the advertisement template and the advertising summary, wherein the custom advertisement is too large to be transmitted over the low bandwidth data service channel in a timely manner during presentation of the program.

19. The system of claim 18, wherein the receiver is configured to combine information provided in the advertisement summary with formatting information provided in the advertisement template to produce a custom advertisement.

20. The system of claim 18, wherein the information provided in the advertisement summary includes a hyperlink.

21. The system of claim 18, wherein the advertisement template further comprises a time stamp.

22. The system of claim 18, wherein the advertisement summary includes a timeout attribute defining a time to end the custom advertisement.

23. The system of claim 18, wherein the advertisement summary includes an attribute that determines at least one of the color, font style, font size, transparency, texture, advertisement size, and advertisement position of the custom advertisement.

24. The system of claim 18, wherein the advertisement summary includes a view attribute that determines whether the custom advertisement is displayed automatically without user intervention.

25. A method as recited in claim 18, wherein the advertising summary is embedded as a trigger.

26. A system for creating a custom advertisement comprising:

a. a broadcast signal source configured to broadcast a program of a specified duration in a broadcast video signal having a data service channel that includes an available data bandwidth;

b. a receiver tuned to receive the program and including local memory, wherein the local memory contains a first set of data representing an advertising template;

c. means for embedding a second set of data in the video signal and broadcasting the second set of data to the receiver, wherein the second set of data represents advertising content addressed to the template; and d. means for combining the first and second sets of data to form a third set of data representing the custom advertisement for display on the receiver, e. wherein the third set of data is greater than a product of the available data bandwidth and the specified duration of the program; and f. wherein the second set of data is less than the product of the available data bandwidth and the specified duration of the program.

27. The system of claim 26, wherein the first set of data is less than one half of the product of the available data bandwidth and the specified duration of the program.

28. The system of claim 26, wherein the program is a television commercial advertisement.

* * * * *

UNITED STATES PATENT AND TRADEMARK OFFICE
CERTIFICATE OF CORRECTION

PATENT NO. : 7,103,904 B1  Page 1 of 1
APPLICATION NO. : 09/345223
DATED : September 5, 2006
INVENTOR(S) : Dean J. Blackketter et al.

It is certified that error appears in the above-identified patent and that said Letters Patent is hereby corrected as shown below:

In column 10, line 6, in Claim 3, delete "Thc" and insert -- The --, therefor.

In column 11, line 2, in Claim 14, after "receiver" delete "," and insert -- ; --, therefor.

In column 12, line 20, in Claim 22, delete "timeout" and insert -- time-out --, therefor.

In column 12, line 49, in Claim 26, after "receiver" delete "," and insert -- ; --, therefor.

Signed and Sealed this

Twentieth Day of July, 2010

David J. Kappos
*Director of the United States Patent and Trademark Office*